Sept. 30, 1952     C. W. JOHNSTONE ET AL     2,612,547
ROTATIONAL ORIENTATION APPARATUS Filed Oct. 24, 1945     3 Sheets—Sheet 1

Inventors
WALTER N. DEAN
CHARLES W. JOHNSTONE
By Ralph L. Chappell
Attorney

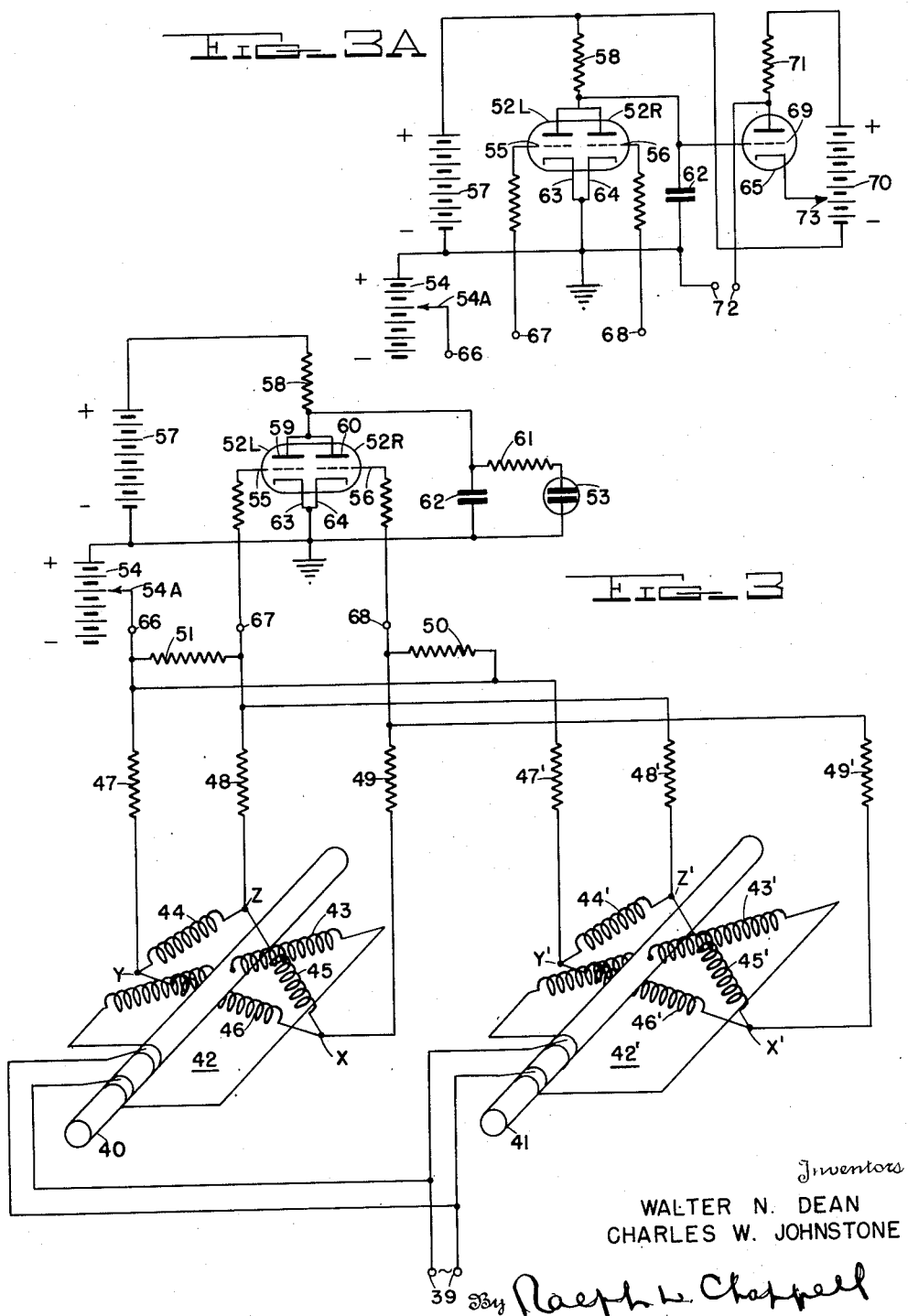

Patented Sept. 30, 1952

2,612,547

UNITED STATES PATENT OFFICE 2,612,547

ROTATIONAL ORIENTATION APPARATUS

Charles W. Johnstone and Walter N. Dean, Washington, D. C., assignors to the United States of America as represented by the Secretary of the Navy Application October 24, 1945, Serial No. 624,296

17 Claims. (Cl. 177—311)

This invention relates in general to electrical control equipment and in particular to apparatus for the orientation of rotatable objects.

In both low and high speed machinery, it frequently occurs that two or more rotating parts such as shafts unlinked by gears or otherwise must either be maintained in a given relative rotational orientation or some means of determining when a given relative rotational orientation exists must be provided.

It is an object of this invention to provide an apparatus for indicating the existence of a single relative rotational orientation of a plurality of rotatable objects.

It is another object of this invention to provide an apparatus for indicating the existence of any one of a plurality of relative rotational orientations of a plurality of rotatable objects.

It is another object of this invention to provide an apparatus for indicating the existence of a selectable orientation of one shaft rotatable with respect to another.

It is another object of this invention to provide an apparatus for indicating visually the existence of a relative rotational orientation of a plurality of rotatable shafts.

It is another object of this invention to provide an apparatus for indicating by means of an electronic "gating" signal the existence of a relative rotational orientation of a plurality of rotatable shafts.

Other objects and features of this invention will become apparent upon a careful consideration of the following detailed description, when taken together with the accompanying drawings in which:

Fig. 3 is a circuit diagram of one embodiment of this invention; and

Fig. 3A is a circuit diagram of a variation of the embodiment of Fig. 3.

Figure 1:
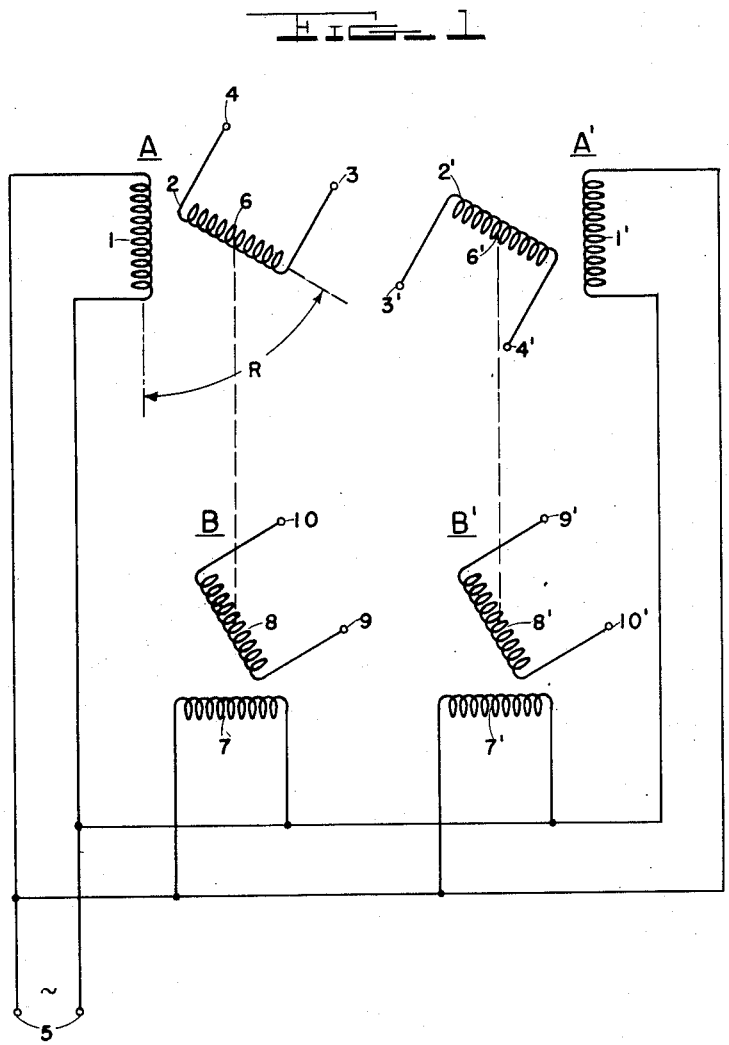
Fig. 1 is a circuit diagram illustrating certain principles of this invention.

One of the principles upon which this invention is based is that an alternating voltage caused to vary sinusoidally in amplitude will, at only two points in a single cycle of amplitude variation, assume any particular amplitude in a selected one of its two phases. The term "amplitude," as used above, hereafter, and in the appended claims, refers not to the instantaneous value, but to the maximum value of the alternating voltage. There will be two other points in the single cycle which will assume the particular amplitude but they will be characterized by a phase difference of 180° with respect to the first mentioned two points.

If a pair of like transformers, each having its secondary rotatable in a single plane around a fixed center with respect to its primary, have their primaries connected to the same source of alternating voltage, there will be found not more than two positions of one secondary for which its voltage will be exactly equal and opposite to that of the other secondary for any given position of such other secondary. One of these positions will correspond to the situation in which the two secondaries bear the same angular relation with respect to their primaries and the other position will be found when one of the secondaries is rotated through a position of maximum voltage without change in phase an angle to twice the angle by which the other secondary is separated from its nearest position of maximum voltage. From the foregoing, the maximum amount of rotation required to move the one secondary from that position of equal and opposite voltage represented by the first situation to that represented by the second situation is 180°. Further, when one secondary is located at a point of maximum voltage, the separation between the positions of the other secondary for equality and opposition disappears and the secondaries bear the same angular relation with respect to their primaries.

If a second and like pair of like transformers, also having their primaries connected to a single source of alternating voltage (not necessarily the same alternating voltage source as supplied the primaries of the first pair of transformers) is so arranged that each of its primaries is oriented in a like manner with respect to a different one of the primaries of the first pair and so that each of its secondaries is oriented in a like manner with respect to a different one of the secondaries of the first pair and moves in angular synchronism therewith, there will be a similar two relative positions of the secondaries of the second pair of transformers which will yield equal and opposite voltages. Further, if the orientation between the primaries of the two pairs is such that the axes of each of the two corresponding primaries form an angle other than the angle formed by the axes of each of the two corresponding secondaries, the conditions in which the secondary voltages of the first pair will be equal and opposite and the secondary voltages of the second pair will be equal and opposite will occur simultaneously only when the secondaries of both pairs of transformers bear the same angular relationship to their respective primaries. Thus, as one secondary of one pair of transformers is held stationary (thus holding one secondary of the other pair stationary) and the other secondaries are rotated through 360°, three conditions of interest will be found. These will consist of two situations in which the secondaries of only one pair will be of equal and opposite voltage and one situation in which the pairs will simultaneously have equal and opposite secondary voltages. A signaling device responsive only to the single condition of equality and opposition of voltages in both pairs of transformers will therefore yield a signal only in a single position of the rotating secondaries as they traverse 360°. In the more general case, both of the two sets of corresponding secondaries may be caused to rotate and will cause the signaling device to yield a steady signal only when the two sets of corresponding secondaries rotate at the same speed in the same direction and with a particular angular relationship or to yield a repetitive signal at a frequency equal to the difference between the rotational frequency of the sets of secondaries. Also, in the more general case, it may be the primaries which are rotatable, or there may be constructed suitable combinations of rotating primaries and secondaries.

For illustration of the foregoing, reference is now had to Fig. 1 in which a pair of transformers, A and A', each has a respective fixed winding 1 and 1' serving as its primary. As shown, these primaries are connected to the same source of alternating voltage 5 in parallel. Transformers A and A' each have a respective winding 2 and 2' which serves as its secondary and may be rotated as by a rotating object, about fixed centers 6 and 6' in (for example) the plane of the paper. With the orientation shown, i. e., with windings 2 and 2' at an equal angle R with their primaries 1 and 1', the secondary voltage from 3 to 4 will be equal and opposite to that from 3' to 4'. If secondary 2 is held stationary, the voltage appearing across it from 3 to 4 will appear as shown by waveform 25 of Fig. 2. If, for the same interval of time represented by waveform 25, secondary 2' is rotated uniformly through 360°, the voltage appearing between 3' and 4' will be as illustrated by waveform 26 in which the envelope (light line) indicates the maximum amplitude which would be reached by the voltage if secondary 2' were stopped at any intermediate point in the revolution. It will be noted that, as secondary 2' is rotated through a position of maximum voltage (parallel with primary 1') without change in phase, an angle equal to twice R, the voltage from 3' to 4' again becomes equal and opposite to that from 3 to 4. While it is true that the secondary voltages are again equal in amplitude at 27 and 28, they are in phase rather than in opposition. Thus, there were found only two positions of secondary 2', 29 and 30, for which its voltage was equal and opposite to that of secondary 2. One of these positions, 29, corresponded to the starting and ending situation in which the two secondaries bore the same angular relation with respect to their priamries 1 and 1'. The other position, 30, corresponded to the situation in which secondary 2 had been rotated through a position of maximum voltage without change of phase an angle equal to two R. It will be apparent from waveforms 25 and 26 that 2R approaches 180° as its limit. It will also be apparent that, if R had been zero, there would have been only one position, i. e., the starting and ending position, in which the voltage from 3' to 4' would have been equal and opposite to that from 3 to 4.

In Fig. 1, B and B' represent a pair of transformers similar to transformers A and A'. Primaries 7 and 7' are connected to A. C. source 5 and are disposed in such a manner that primary 7' is oriented in the same manner with respect to primary 1' of transformer A' as primary 7 is oriented with respect to primary 1 of transformer A. Secondary 8 is linked mechanically to secondary 2 and secondary 8' is mechanically linked to secondary 2' so as to rotate synchronously therewith. Secondary 8' is oriented in the same manner with respect to secondary 2' as secondary 8 is oriented with respect to secondary 2. It should be noted here that primaries 1 and 1' may be oriented in any manner with respect to each other provided the relations described above regarding transformers B and B' are preserved.

Figure 2:
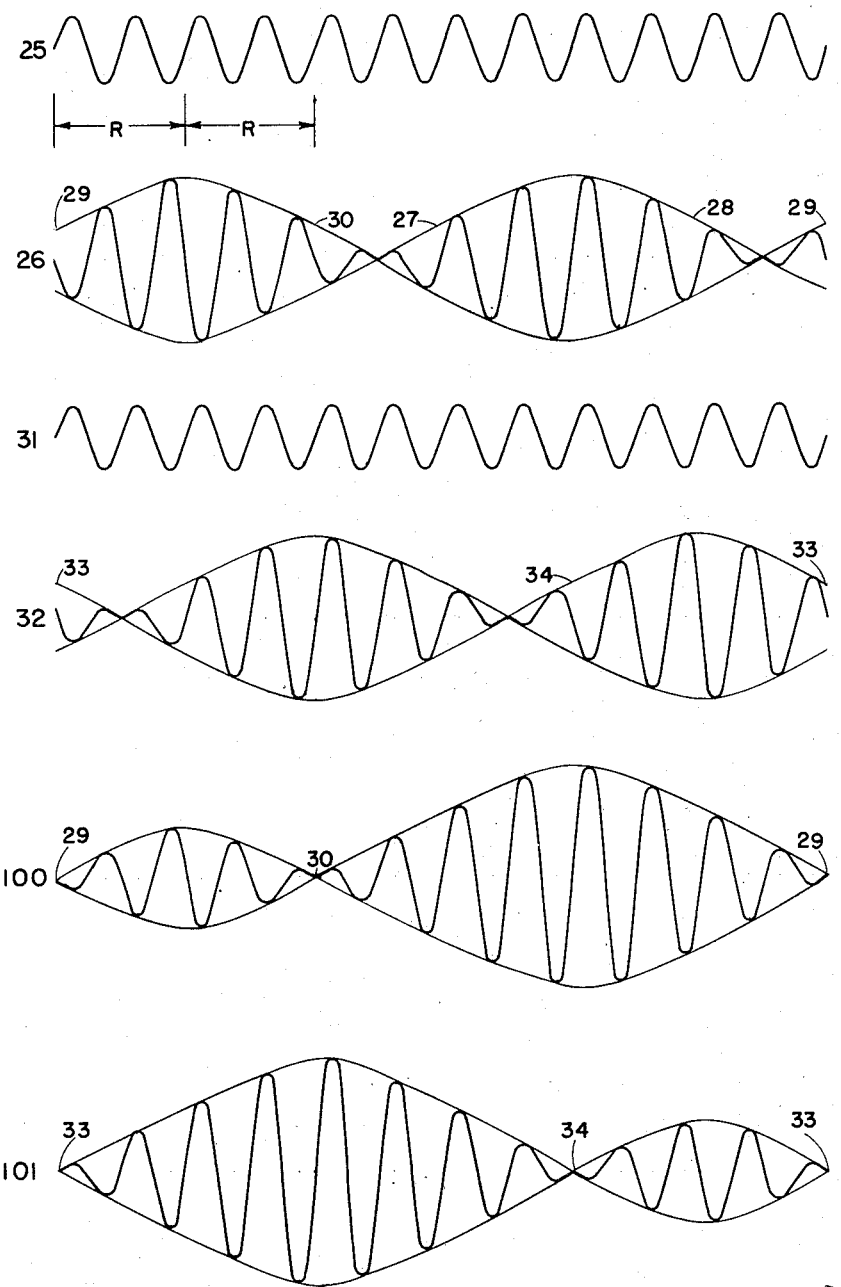
Fig. 2 is a series of waveforms useful in explaining the operation of this invention.

If secondary 8 is held stationary, the voltage across it from 9 to 10 will appear as shown by waveform 31 of Fig. 2. As secondary 2' was rotated as described above, the voltage appearing from 9' to 10' across secondary 8' is shown by waveform 32. Waveform 32 has the same significance as waveform 26 but it will be noted that, at only one position of secondary 8', 33, did the voltage from 9' to 10' oppose and equal the voltage from 9 to 10 simultaneously with a corresponding opposition and equality of the voltages across primaries 2 and 2'. At point 30 of waveform 26, 2 and 2' voltages were equal and opposite but the corresponding position of secondary 8' did not provide a similar condition. Similarly, at point 34 of waveform 32, 8 and 8' voltages were equal and opposite but the corresponding position of secondary 2' did not provide a corresponding condition. Thus, only when secondary 2' bore the same angular relationship to primary 1' as secondary 2 bore to primary 1 and secondary 8' bore the same angular relationship to primary 7' as secondary 8 bore to primary 7 were the voltages across each pair of secondaries equal and opposite.

If, for example, a signaling means were provided which was responsive only to the conditions of equality and opposition existing at point 29 (and identical point 33), and secondaries 2 and 8 were held stationary at any degree of rotation around their centers, rotation of secondaries 2' and 8' would cause the signaling device to function only when secondaries 2' and 8' bore the same angular relation to primaries 1' and 7' as secondaries 2 and 8 bore to primaries 1 and 7. Likewise, if secondaries 2 and 8 were also rotating, the signaling device would be caused to function only during the existence of one specified relative position of secondaries 2' and 8' with respect to secondaries 2 and 8. It should be noted here that primaries 7 and 7' could have been connected to a source of alternating voltage other than source 5, having no particular phase or frequency relationship with source 5, without affecting the operations described. It should also be noted here that, with primaries 7 and 7' connected to the same alternating voltage source as primaries 1 and 1', the voltage from 3 to 4 will oppose and equal that from 9' to 10' simultaneously with a similar opposition and equality of the voltage from 9 to 10 and 3' to 4' at a different orientation of secondaries 2' and 8' with primaries 1' and 7' for every different orientation of secondaries 2 and 8 with respect to primaries 1 and 7. For this reason, direct relative orientation requires that the relations previously outlined be maintained as between the secondaries which are selected for equality and opposition.

A practical embodiment of this invention utilizing the principles explained above consists of the shaft alignment indicator illustrated in Fig. 3. The two shafts 40 and 41 (which need not be parallel as shown) represent two rotatable shafts which may assume any angular orientation with respect to each other. They may represent the shafts, for example, of two rotatable directional antennas, not shown, or they may be geared in a 1 to 1 ratio to such antenna shafts. In the antenna example, it may be desired to have a signal only at such times as the two antennas are oriented in the same direction. In order to obtain this signal, a small alternating current machine known variously as a "synchro," or a "synchronous unit" or by such trade names as "Selsyn," "Syncrotie," or "Autosyn" may be mounted on each of shafts 40 and 41. Synchro 42 on shaft 40 comprises rotor winding 43 and three stator windings 44, 45, and 46 delta connected. The terminals of rotor winding 43 are brought out to slip rings on shaft 40 which serve to supply alternating voltage from source 39. Thus, in effect, synchro 42 is like a single phase transformer, of which rotor winding 43 is the primary and the three stator windings 44, 45, and 46 are secondaries. The magnitude of the stator voltages depends on the mechanical position of the rotor. If the axis of rotor 43 coincides with the axis of a particular stator winding, the voltage induced in that stator winding has its greatest value. If the rotor is turned 90°, the voltage becomes zero. A further rotation of 90° causes the voltage again to have maximum amplitude, but the voltage is then 180° out of phase with that obtained at the first rotor position. Since the stator windings are delta connected, they are 120° apart in rotational position. The voltage across stators 44, 45 and 46 are not 120° apart in phase but are either in phase with each other or are 180° out of phase. Synchro 42' on shaft 41 comprises a similar arrangement and may be likewise said to constitute a single phase transformer of which rotor 43' is the primary and the three stator windings 44', 45' and 46' are the secondaries. Corresponding terminal points of the delta connected stators of synchros 42 and 42' are connected to each other through two equal current-limiting resistors typified by resistors 47 and 47' connecting the junctions of stators 44 and 46 to the junction of stators 44' and 46'.

Let it be assumed that shaft 40 is held stationary and that shaft 41 is rotated clockwise through 360° from the position shown. Then the voltage appearing across stator 46 from Y to X will appear as shown in waveform 25 of Fig. 2 while waveform 26 of Fig. 2 will represent the voltage appearing across stator 46' from Y' to X'. It will be seen that the circuit containing winding 46, resistors 47 and 47', winding 46', and resistors 49' and 49 forms a closed loop across which is disposed resistor 50. The symmetrical disposition of resistor 50 provides that there appears across it the parallel combination of the voltages appearing across windings 46 and 46'. Thus, as shaft 41 rotates through 360° from the position shown, a voltage appears across resistor 50 which is illustrated by waveform 100 of Fig. 2. This waveform bears out the fact that, as shaft 41 rotates, there are two points, 29 and 30, at which the voltage across stator 46' equals and opposes that across stator 46. Similarly, waveform 31 represents the voltage appearing across stator 44 from Y to Z while waveform 32 represents the voltage appearing across stator 44' from Y' to Z'. Resistor 51 is disposed with respect to stators 44 and 44' in the same manner as resistor 50 is disposed with respect to stators 46 and 46' so that waveform 101 represents the voltage appearing across resistor 51. A comparison of waveforms 100 and 101 demonstrates the fact that, at only one point in the rotation of shaft 41, do the stator voltages result in a condition of zero voltage across resistors 50 and 51 simultaneously. This point is that shown in Fig. 3 in which rotor 43' bears the same relation to the stator windings of synchro 42' as rotor 43 bears to the stator windings of synchro 42. A preferred, but not unique, means of detecting this identity of relationship is represented by dual triode vacuum tube elements 52L and 52R and neon tube 53 together with their associated circuit components. Direct current source 54 connected between cathodes 63 and 64 of 52L and 52R and the circuits which include the stators of synchros 42 and 42' is of such a potential at tap 54A as to bias the stator circuits (and hence grid 55 of 52L and grid 56 of 52R) at, or about, the cutoff potential of tubes 52L and 52R. Thus, when A. C. source 39 is disconnected or when no voltage appears across either resistor 50 or resistor 51, little or no current may flow through 52L and 52R. Direct current source 57, connected to the cathodes 63 and 64 of 52L and 52R and through resistor 58 to the plates of those tube elements is of a potential slightly greater than that required to cause neon tube 53 to glow. Non-conduction by 52L and 52R permits plates 59 and 60 to rise to approximately the positive potential of D. C. source 57 to which they are connected. This potential is also applied across neon tube 53 through current limiting resistor 61 and causes neon tube 53 to glow when A. C. source 39 is disconnected or shafts 40 and 41 are aligned in the relation previously described. It will be apparent that were A. C. source 39 connected and shafts 40 and 41 rotated out of alignment, neon tube 53 would tend to glow at the frequency of the current supplied by A. C. source 39. This would be a pulsating condition most evident when the voltages across resistors 50 and 51 were in phase so as to render 52L and 52R non-conducting for every half cycle of the alternating current. An examination of waveforms 100 and 101 reveals that, in the particular orientation of rotor 43 shown, an in-phase condition exists between the positions of shaft 41 identified by points 30 and 34 of waveforms 100 and 101. Capacitor 62 has been connected between plates 59 and 60 and cathodes 63 and 64 of such a capacitance that, in combination with resistor 58, it forms an R-C circuit having a long time-constant compared to a half period of the A. C. source. When, however, either tube 52L or tube 52R, or both, conduct, capacitor 62, in combination with the plate resistance of 52L or 52R forms a circuit having a time constant which is short compared to a half period of the A. C. source. Thus, capacitor 62 charges slowly (compared to a half period of the A. C. source) when 52L and 52R are non-conducting and discharges rapidly when 52L or 52R or both are conducting to prevent firing of neon tube 53 at the frequency of the A. C. source when shafts 40 and 41 are not aligned. When shafts 40 and 41 are aligned, no voltage appears across either resistor 50 or resistor 51, tubes 52L and 52R are held non-conducting and capacitor 62 charges up to approximately the potential across D. C. source 57 thus causing tube 53 to glow to signal the desired alignment. In effect, tubes 52L and 52R serve as half wave rectifiers which preserve the positive half cycles of voltage appearing across sistors 50 and 51, and capacitor 62, in combination with resistance 58 and tubes 52L and 52R is, in effect, a filter to smooth out voltage variations which occur at the frequency of A. C. source 39. Such half wave rectification may be accomplished also by the use of diode vacuum tubes or by other means known to the art. Resistors 50 and 51, while they are helpful in explaining the operation of the circuit, are not essential elements and may be eliminated without disturbing the functioning of the apparatus.

To those versed in the art, it will be apparent that the usefulness of the visual signaling device shown in Fig. 3 is limited by the fact that if the speed of one shaft is enough greater than the other, neon tube 53 will tend to glow at a high enough rate to simulate constant conduction. If this difference in relative speed is great enough, capacitor 62 will not charge sufficiently during the alignment intervals to cause tube 53 to fire at all. This last condition is, of course, a function of the frequency of A. C. source 39 and the time constants of the circuits glow of tube 53 between alignment positions.

The alignment detecting means shown in Fig. 3 may be replaced by other means which will overcome the aforementioned illusion of glow continuity. Such an alternate means is shown in Fig. 3A which differs from the means in Fig. 3 in that neon tube 53 and resistor 61 have been replaced by sharp cutoff vacuum tube 65 and its associated components. The connections to the stator circuits for the means shown in Fig. 3A are identical with those for the means shown in Fig. 3 so that the direct replacement may be made at points 66, 67, and 68. Only when shafts 40 and 41 are substantially in alignment does capacitor 62 charge to a high potential to raise grid 69 above cutoff potential. The resulting conduction by tube 65 permits current to flow from D. C. source 70 through resistor 71. The flow of current through resistor 71 causes a voltage drop across it which appears as a reduction in potential at terminals 72. Thus, alignment of shafts 40 and 41 is signaled at terminals 72 by a reduction in voltage which may be employed to energize any suitable type of following circuit. For example, the reduction in voltage may be employed as a "gate" to activate certain receiver circuits only when two antenna shafts are in a desired alignment. The degree of accuracy of alignment may be controlled by adjustment of tap 54A on direct current source 54. If a narrow "gate" at terminals 72 is desired, tap 54A may be set at a potential substantially the same as the cutoff potential of tubes 52L and 52R. Under such conditions, only the closest rotational alignment of shafts 40 and 41 will cause capacitor 62 to charge up to the conduction potential of tube 65. A potential greater than cutoff for tap 54A (greater bias) provides for conduction by tube 65 not only when exact alignment occurs but also for a selectable number of degrees on each side of exact alignment. A similar result may be obtained by adjustment of the bias on tube 65 by means of cathode tap 73 on D. C. supply 70.

Familiarity with the art will permit other changes in the means of detecting alignment and will permit a wide variety of changes and elaborations to be made in the circuits shown, all based upon the principles heretofore laid down. For example, a second signaling device (either as shown in Fig. 3 or Fig. 3A) may be connected to the stators of Fig. 3 to signal a relative shaft orientation 120° removed from that shown in Fig. 3. Similarly, a third signaling device would indicate the third 120° position. The stators may be rotatable so that the relative orientation of the shafts which yield a signal may be selectable over the entire 360° range. The stators may comprise any number of windings, each pair having a suitable signaling device and each providing an indication of a different shaft alignment. Another step in construction made obvious by the foregoing under circumstances where more than two shafts must be aligned or a signal provided when they are in alignment is to provide each shaft with a single phase transformer arrangement similar to that shown in Fig. 3 and provides corresponding triodes in parallel with triodes 52L and 52R. While delta connected stators have been shown, these may be Y-connected and similar results obtained.

Since certain further changes may be made in the foregoing construction and different embodiments of the invention may be made without departing from one scope thereof, it is intended that all matter shown in the accompanying drawings or set forth in the accompanying specification shall be interpreted as illustrative and not in a limiting sense.

What is claimed is:

1. The method of indicating a given rotational orientation of two objects comprising, causing two objects each to generate simultaneously two alternating voltages the amplitudes of which vary sinusoidally through 360 electrical degrees as each of said objects rotates through 360 mechanical degrees, said sinusoidal amplitude variations of the voltages generated by one of said objects bearing the same phase relation, other than zero or 180 degrees, to each other, as the said sinusoidal amplitude variations of the voltages generated by the other of said objects bear to each other, combining each of said voltages generated by one of said objects with a respective one of said voltages generated by the other of said objects to produce two alternating voltages which have zero amplitudes simultaneously at only one relative orientation of said two objects, and producing an indicating signal only when last said two voltages have substantially zero amplitude simultaneously.

2. The method of indicating a given rotational orientation of two objects comprising, causing two objects each to generate simultaneously two alternating voltages the amplitudes of which vary sinusoidally through 360 electrical degrees as each of said objects rotates through 360 mechanical degrees, said sinusoidal amplitude variations of the voltages generated by one of said objects bearing the same phase relation, other than zero or 180 degrees, to each other, as the said sinusoidal amplitude variations of the voltages generated by the other of said objects bear to each other, combining each of said voltages generated by one of said objects with a respective one of said voltages generated by the other of said objects to produce two alternating voltages which have zero amplitudes simultaneously at only one relative orientation of said two objects, rectifying last said two voltages, filtering said rectified voltages, and producing an indicating signal only when said filtered voltages are substantially zero simultaneously.

3. Apparatus for the orientation of rotatable objects comprising, a plurality of transformer means each associated with a respective one of a plurality of objects rotatable with respect to each other, said plurality of transformer means each generating at least two alternating voltages the amplitudes of which vary sinusoidally through 360 electrical degrees as each of said objects rotates through 360 mechanical degrees, means electrically connecting said plurality of transformer means combining each of at least two of said voltages generated by each of said plurality of transformers with a respective one of two of said voltages generated by another of said plurality of transformers, the arrangement of said electrical connecting means being such that interconnection exists between all of the plurality of said transformer means, and means responsive to said combined voltages producing an indicating signal only when said combined voltages all are of substantially zero amplitude.

4. Apparatus for the orientation of rotatable objects comprising, first and second transformer means each associated with a respective one of two objects rotatable with respect to each other, said first and second transformer means each generating at least two alternating voltages the amplitudes of which vary sinusoidally through 360 electrical degrees as each of said objects rotates through 360 mechanical degrees, means electrically connecting said transformer means combining each of said voltages generated by said first transformer means with a respective one of said voltages generated by said second transformer means, and means responsive to at least two of said combined voltages producing an indicating signal only when said two combined voltages are of substantially zero amplitude.

5. Apparatus for the orientation of rotatable objects comprising, first and second transformer means each associated with a respective one of two objects rotatable with respect to each other, said first and second transformer means each generating at least two alternating voltages the amplitudes of which vary sinusoidally through 360 electrical degrees as each of said objects rotates through 360 mechanical degrees, said sinusoidal variations of amplitude of said two voltages generated by said first transformer means having a predetermined phase difference other than zero or 180 degrees, said sinusoidal variations of amplitude of said two voltages generated by said second transformer means having same said predetermined phase difference, resistance means electrically connecting said transformer means combining each of said voltages generated by said first transformer means with a respective one of said voltages generated by said second transformer means, and means connected to said resistance means and responsive to said combined voltages producing an indicating signal only when said combined voltages are simultaneously of substantially zero amplitude.

6. Apparatus for the orientation of rotatable objects comprising, first and second transformer means each associated with a respective one of two objects rotatable with respect to each other, said first and second transformer means each generating at least two alternating voltages which are either in phase or 180 degrees out of phase according to the rotational orientation of the object with which they are associated, said two alternating voltages varying sinusoidally in amplitude through 360 electrical degrees as the objects with which they are associated rotate through 360 mechanical degrees, said sinusoidal variations of amplitude of said two voltages generated by said first transformer means having a predetermined phase difference other than zero or 180 degrees, said sinusoidal variations of amplitude of said two voltages generated by said second transformer means having same said predetermined phase difference, resistance means electrically connecting said transformer means combining each of said voltages generated by said first transformer means with a respective one of said voltages generated by said second transformer means, and means connected to said resistance means and responsive to said combined voltages producing an indicating signal only when said combined voltages are simultaneously of substantially zero amplitude.

7. Apparatus as described in claim 6 in which said means responsive to said combined voltages comprises, means half-wave rectifying said combined voltages, resistance-capacitance means connected to said rectifying means so as to filter the output thereof, and means responsive to the amplitude of said filtered output for providing an indicating signal.

8. Apparatus as described in claim 6 in which said means responsive to said combined voltages comprises triode vacuum tube means normally biased in the region of tube current cutoff so as to half-wave rectify said combined voltages, resistance-capacitance means connected to said vacuum tube means so as to filter the output thereof, and gas tube discharge means responsive to said filtered output for providing a visual indicating signal.

9. Apparatus as described in claim 6 in which said means responsive to said combined voltages comprises triode vacuum tube means normally biased in the region of tube current cutoff so as to half-wave rectify said combined voltages, resistance-capacitance means connected to said vacuum tube means so as to filter the output thereof, and vacuum tube means responsive to said filtered output for providing an electronic gating signal.

10. Apparatus for the orientation of rotatable objects comprising, first and second single phase transformer means each associated with a respective one of two objects rotatable with respect to each other, said first and second transformer means each comprising a primary winding and at least two secondary windings, said primary winding being rotatable relative to said secondary windings as said object with which it is associated rotates, said two secondary windings of said first transformer means being so disposed with respect to their primary winding and to each other that the secondary voltages induced therein vary in amplitude sinusoidally through 360 electrical degrees as said associated object rotates through 360 mechanical degrees with a predetermined phase difference in said sinusoidal variation other than zero or 180 degrees, said two secondary windings of said second transformer means being disposed in a like manner with respect to their primary winding and to each other, a source of alternating voltage common to the primary windings of said first and second transformer means, resistance means electrically connecting said secondary windings combining each of said secondary voltages induced in said first transformer means with a respective one of said secondary voltages induced in said second transformer means, and means connected to said resistance means and responsive to said combined voltages producing an indicating signal only when said combined voltages are simultaneously of substantialy zero amplitude.

11. Apparatus as described in claim 10 in which said means responsive to said combined voltages comprises, means half-wave rectifying said combined voltages, resistance-capacitance means connected to said rectifying means so as to filter the output thereof, and means responsive to the amplitude of said filtered output for providing an indicating signal.

12. Apparatus as described in claim 10 in which said means responsive to said combined voltages comprises triode vacuum tube means normally biased in the region of tube current cutoff so as to half-wave rectify said combined voltages, resistance-capacitance means connected to said vacuum tube means so as to filter the output theerof, and gas tube discharge means responsive to said filtered output for providing a visual indicating signal.

13. Apparatus as described in claim 10 in which said means responsive to said combined voltages comprises triode vacuum tube means normally biased in the region of tube current cutoff so as to half-wave rectify said combined voltages, resistance-capacitance means connected to said vacuum tube means so as to filter the output thereof, and vacuum tube means responsive to said filtered output for providing an electronic gating signal.

14. In combination, a first and second synchro each comprising a rotor and a stator carrying relatively movable primary and at least two secondary windings and each synchro associated with a respective one of two objects rotatable with respect to each other in such a manner that said rotor rotates through 360 mechanical degrees with respect to said stator as said associated object rotates through 360 mechanical degrees, a source of alternating voltage common to said primary windings of said first and second synchros, current limiting resistance means connecting each of said secondary windings of said first synchro with a respective one of said secondary windings of said second synchro so as to combine the voltages induced in said secondary windings, and means connected to said resistance means and responsive to said combined voltages producing an indicating signal only when said combined voltages are simultaneously of substantialy zero amplitude.

15. Apparatus as described in claim 14 in which said means responsive to said combined voltages comprises, means half-wave rectifying said combined voltages, resistance-capacitance means connected to said rectifying means so as to filter the output thereof, and means responsive to the amplitude of said filtered output for providing an indicating signal.

16. Apparatus as described in claim 14 in which said means responsive to said combined voltages comprises triode vacuum tube means normally biased in the region of tube current cutoff so as to half-wave rectify said combined voltages, resistance-capacitance means connected to said vacuum tube means so as to filter the output thereof, and gas tube discharge means responsive to said filtered output for providing a visual indicating signal.

17. Apparatus as described in claim 14 in which said means responsive to said combined voltages comprises triode vacuum tube means normally biased in the region of tube current cutoff so as to half-wave rectify said combined voltages, resistance-capacitance means connected to said vacuum tube means so as to filter the output thereof, and vacuum tube means responsive to said filtered output for providing an electronic gating signal.

CHARLES W. JOHNSTONE.
WALTER N. DEAN.

REFERENCES CITED

The following references are of record in the file of this patent:

UNITED STATES PATENTS

| Number | Name | Date |
| --- | --- | --- |
| 1,895,240 | Vopel et al. | Jan. 24, 1933 |
| 2,205,330 | Allen | June 18, 1940 |
| 2,388,977 | Johnson | Nov. 13, 1945 |
| 2,420,193 | Rich | May 6, 1947 |

FOREIGN PATENTS

| Number | Country | Date |
| --- | --- | --- |
| 100,416 | Sweden | Dec. 3, 1940 |